United States Patent
Sasagawa et al.

(10) Patent No.: US 6,767,969 B2
(45) Date of Patent: Jul. 27, 2004

(54) HYDROGENATED POLYMER

(75) Inventors: Masahiro Sasagawa, Kanagawa (JP);
Shigeru Sasaki, Kanagawa (JP);
Shigeki Takayama, Tokyo (JP);
Takashi Sato, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 153 days.

(21) Appl. No.: 10/168,613
(22) PCT Filed: Oct. 19, 2001
(86) PCT No.: PCT/JP01/09222
§ 371 (c)(1),
(2), (4) Date: Jun. 24, 2002
(87) PCT Pub. No.: WO02/34800
PCT Pub. Date: May 2, 2002

(65) Prior Publication Data
US 2003/0125475 A1 Jul. 3, 2003

(30) Foreign Application Priority Data
Oct. 25, 2000 (JP) ..................................... P2000-325048

(51) Int. Cl.$^7$ ............................. C08F 8/04; C08L 9/00
(52) U.S. Cl. .................... 525/338; 525/232; 525/331.9; 525/332.8; 525/332.9; 525/333.2; 525/374; 525/385; 525/386
(58) Field of Search .............................. 525/232, 331.9, 525/332.8, 332.9, 333.2, 338, 374, 385, 386

(56) References Cited

U.S. PATENT DOCUMENTS

| | | | |
|---|---|---|---|
| 4,226,952 A | | 10/1980 | Halasa et al. |
| 4,252,914 A | | 2/1981 | Halasa et al. |
| 4,673,714 A | | 6/1987 | Kishimoto et al. |
| 5,017,660 A | * | 5/1991 | Hattori et al. ............... 525/338 |
| 5,527,753 A | | 6/1996 | Engel et al. |
| 5,585,441 A | | 12/1996 | Brandes et al. |
| 5,708,092 A | | 1/1998 | Schwindeman et al. |

FOREIGN PATENT DOCUMENTS

| | | |
|---|---|---|
| GB | 2241239 A | 8/1991 |
| JP | 42-8704 | 4/1967 |
| JP | 43-6636 | 3/1968 |
| JP | 56-30447 | 3/1981 |
| JP | 56-30455 | 3/1981 |
| JP | 63-4841 | 2/1988 |
| JP | 1-37970 | 8/1989 |
| JP | 1-53851 | 11/1989 |
| JP | 2-9041 | 2/1990 |
| JP | 2-36244 | 2/1990 |
| JP | 3-128957 | 5/1991 |
| JP | 4-39495 | 6/1992 |
| JP | 8-109210 A | 4/1996 |
| JP | 8-109219 | 4/1996 |
| JP | 10-25395 | 1/1998 |
| JP | 11-504663 | 4/1999 |

\* cited by examiner

*Primary Examiner*—Fred Teskin
(74) *Attorney, Agent, or Firm*—Birch, Stewart, Kolasch & Birch, LLP

(57) ABSTRACT

A hydrogenated polymer obtained by hydrogenating a conjugated diene polymer having an average vinyl bond content of 20% by weight or more and less than 40% by weight to a degree such that 85% or more of double bond residues in the conjugated diene unit portion are hydrogenated, wherein (1) the crystallizing peak temperature and the hydrogenated vinyl bond content satisfy the formula:

$$-2.8V+100<T<-2.8V+130$$

wherein T is the crystallizing peak temperature (° C.) measured by DSC; and V is the hydrogenated vinyl bond content (%),
(2) the molecular weight is 60,000 to 600,000, and
(3) the molecular weight distribution is 1.55 to 5.0. The hydrogenated polymer is excellent in mechanical strength, heat resistance, weatherability and processability and, when blended with other thermoplastic resins or rubbery polymers, provides molded articles with well-balanced physical properties such as impact resistance and moldability.

13 Claims, 3 Drawing Sheets

HYDROGENATED POLYMER

This application is the national phase under 35 U.S.C. §371 of PCT International Application No. PCT/JP01/09222 which has an International filing date of Oct. 19, 2001, which designated the United States of America.

TECHNICAL FIELD

This invention relates to a hydrogenated polymer which is excellent in mechanical strength, heat resistance, weatherability, and processability and provides compositions having high impact resistance and excellent moldability when blended with other thermoplastic resins or rubbery polymers. The invention also relates to a composition containing the polymer and a film or a sheet containing the polymer.

BACKGROUND ART

Having unsaturated double bonds, a conjugated diene polymer is inferior in heat stability, weatherability, and ozone resistance. Methods for improving these properties by hydrogenating the unsaturated double bonds have long been known. Such methods are disclosed, e.g., in JP-A-56-30447 and JP-A-2-36244.

On the other hand, a hydrogenated block copolymer comprising a conjugated diene and a vinyl aromatic hydrocarbon possesses elasticity at ambient temperature without vulcanization like vulcanized natural rubber and synthetic rubber and exhibits the same processability in high temperature as thermoplastic resins and has therefore been widely used in the fields of plastic modification, pressure-sensitive adhesives, automobile parts, medical equipment, and the like. In order to draw similar characteristics from a polymer consisting of a conjugated diene compound, it has recently been attempted to hydrogenate a conjugated diene polymer having a vinyl bond-rich block and a vinyl bond-poor block in the polymer chain.

For instance, JP-A-56-30455 discloses a composition comprising (1) a hydrogenated diblock copolymer consisting of a first block having not more than 15% by weight 1,2-microstructure and a second block having at least 30% by weight 1,2-microstructure and (2) an α-olefin polymer. JP-A-3-128957 proposes a thermoplastic elastomer composition comprising (1) a hydrogenated diene polymer obtained by hydrogenating a block copolymer consisting of polybutadiene block segments having a 1,2-vinyl bond content of not more than 20% by weight and block segments of which the butadiene unit portion has a 1,2-vinyl bond content of 25 to 95% by weight in the butadiene and (2) a thermoplastic resin and/or a rubbery polymer. JP-A-10-25395 teaches a hydrogenated block copolymer composition obtained by hydrogenating block copolymers comprising conjugated diene polymer blocks having a vinyl bond content less than 90% by weight and a difference of 10% by weight or more between maximum and minimum vinyl bond contents in the conjugated diene polymer.

These block copolymers have poor mechanical strength however. Hydrogenated conjugated diene polymers having further improved mechanical strength have been desired for individual use or a combined use with various thermoplastic resins or rubbery substances.

DISCLOSURE OF THE INVENTION

An object of the present invention is to provide a hydrogenated polymer excellent in mechanical strength, heat resistance, weatherability, and processability and fit for industrial production. Another object of the invention is to provide a composition of the hydrogenated polymer and other thermoplastic resins or rubbery polymers which is excellent in impact resistance and moldability. A still other object of the invention is to provide a film or a sheet containing the hydrogenated polymer which is excellent in impact resistance and transparency.

The present inventors have conducted extensive investigations to settle the above-described problems and found, as a result, that the above objects can be achieved by a certain hydrogenated polymer which is a hydrogenation product of a conjugated diene polymer having a specific vinyl bond content, in which the crystallizing peak temperature and the hydrogenated vinyl bond content are in a specific relationship, and of which the molecular weight and the molecular weight distribution are in specific ranges. The present invention has been completed based on this finding.

The present invention provides a hydrogenated polymer obtained by hydrogenating a conjugated diene polymer having an average vinyl bond content of 20% by weight or more and less than 40% by weight to a degree such that 85% or more of double bond residues in the conjugated diene unit portion are hydrogenated, wherein (1) the crystallizing peak temperature and the hydrogenated vinyl bond content satisfy the formula:

$$-2.8V+100 < T < -2.8V+130$$

wherein T is the crystallizing peak temperature (° C.) measured by DSC; and V is the hydrogenated vinyl bond content (%), (2) the molecular weight is 60,000 to 600,000, and (3) the molecular weight distribution is 1.55 to 5.0.

The present invention also provides a composition comprising the hydrogenated polymer and a thermoplastic resin and/or a rubbery polymer. The present invention also provides a film or a sheet containing the hydrogenated polymer.

BEST MODE FOR CARRYING OUT THE INVENTION

Figure 1:
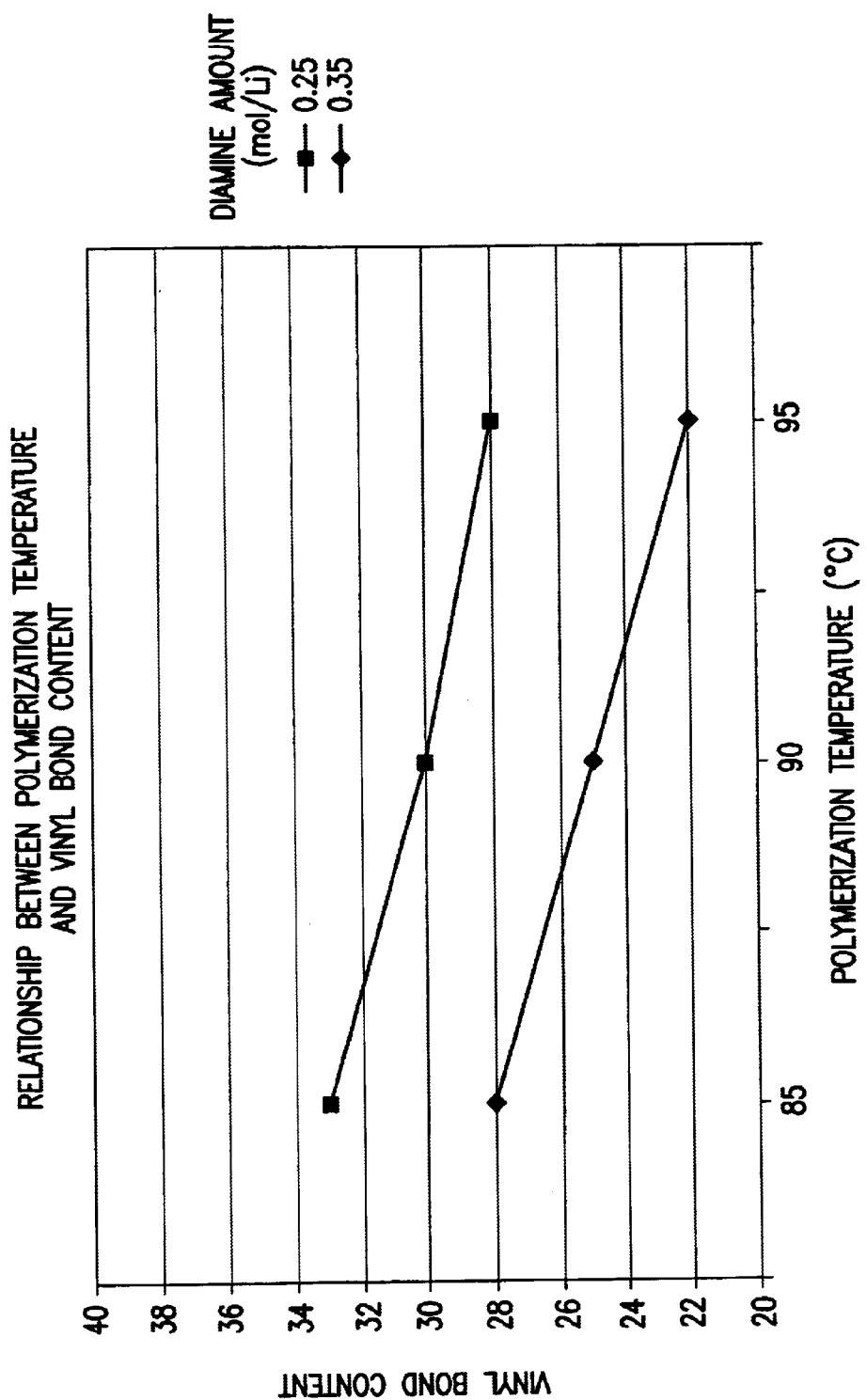
FIG. 1 is a diagram showing the relationship between a polymerization temperature and a vinyl bond content.

The hydrogenated polymer according to the present invention is a hydrogenation product of a polymer whose vinyl bond content is 20% by weight or more and less than 40% by weight, preferably 22 to 38% by weight, still preferably 25 to 35% by weight. The term "vinyl bond content" as used herein denotes the proportion of conjugated diene units constituting the polymer through a 1,2-bond and a 3,4-bond in all the conjugated diene units constituting the polymer through a 1,2-bond, a 3,4-bond and a 1,4-bond. A polymer having an average vinyl bond content less than 20% by weight has poor suitability to production because it hardly dissolves in a hydrocarbon solvent used in the production of a hydrogenated polymer. Besides, a hydrogenated polymer from such a polymer has poor effect in improving impact resistance when blended with thermoplastic resins. If the average vinyl bond content exceeds 40% by weight on the other hand, the hydrogenated polymer will have reduced tensile strength.

The hydrogenated polymer of the invention is a product obtained by hydrogenating 85% or more, preferably 90% or more, still preferably 92% or more, particularly preferably 95% or more, of the double bond residues of the conjugated diene portion of the above-specified conjugated diene polymer. If the degree of hydrogenation is lower than 85%, the hydrogenated polymer will have reduced tensile strength.

The great characteristic of the present invention lies in that the crystallizing peak temperature and the hydrogenated vinyl bond content satisfy the relationship: $-2.8V+100<T<-2.8V+130$, preferably $-2.8V+105<T<-2.8V+125$, wherein T is the crystallizing peak temperature measured by DSC, and V represents the hydrogenated vinyl bond content. When a plurality of crystallizing peak temperatures are observed, the highest one is taken. In the case of a hydrogenated conjugated diene polymer, the crystallizing peak temperature correlates with its hydrogenated vinyl bond content. A hydrogenated polymer that does not satisfy the above relationship has reduced tensile strength and, when blended with thermoplastic resins, provide compositions with low rigidity. The above relationship is considered attributable to distribution of the vinyl bond content before hydrogenation. That is, a larger variation of vinyl bond content among polymer chains results in a greater T. When the difference between the maximum and the minimum vinyl bond contents is 10% by weight, T equals $-2.8V+125$. The polymer chains may have a tapered vinyl bond content distribution with the maximum-minimum difference being less than 10% by weight. The maximum-minimum difference of vinyl bond content as referred to herein denotes a difference between the maximum and minimum vinyl bond contents that are decided by polymerization conditions, i.e., the kind and the amount of a vinyl content modifier and the polymerization temperature. The maximum-minimum difference of vinyl bond content in conjugated diene polymer chains can be controlled by, for example, polymerization temperature in the preparation of the conjugated diene polymer. With the kind and the amount of a vinyl content modifier, such as a tertiary amine compound or an ether compound, being unchanged, the amount of vinyl bonds incorporated into a polymer chain is decided by the polymerization temperature (see Reference Examples hereinafter described). Accordingly, a polymer produced by isothermal polymerization has vinyl bonds uniformly distributed, whereas a polymer produced at a rising temperature has a vinyl bond content distribution such that a portion obtained in the initial stage (polymerized in lower temperatures) has a higher vinyl bond content while a portion obtained in the latter stage (polymerized in higher temperatures) has a lower vinyl bond content.

The hydrogenated polymer of the present invention has a weight average molecular weight of 60,000 to 600,000, preferably 70,000 to 500,000, still preferably 80,000 to 400,000, and a molecular weight distribution of 1.55 to 5.0, preferably 1.6 to 4.5, still preferably 1.85 to 4. A hydrogenated polymer having a molecular weight less than 60,000 has poor tensile strength. A hydrogenated polymer having a molecular weight exceeding 600,000 has poor processability. A hydrogenated polymer having a molecular weight distribution smaller than 1.55 has not only poor processability when used alone but poor moldability when blended with thermoplastic resins or rubbery polymers. A hydrogenated polymer having a molecular weight distribution greater than 5 has poor tensile strength. The hydrogenated polymer may have one or more than one peaks of molecular weight but preferably has one peak for assuring high tensile strength.

The conjugated diene compound which constitutes the conjugated diene polymer of the present invention is a diolefin having a pair of conjugated double bonds, including 1,3-butadiene, 2-methyl-1,3-butadiene (isoprene), 2,3-dimethyl-1,3-butadiene, 1,3-pentadiene, 2-methyl-1,3-pentadiene, and 1,3-hexadiene. In particular, 1,3-butadiene and isoprene are commonly used. These compounds can be used either individually or in combination of two or more thereof. While the hydrogenated polymer of the invention is substantially made up of the conjugated diene compounds, a vinyl aromatic compound may be copolymerized according to necessity. The vinyl aromatic compound includes styrene, α-methylstyrene, p-methylstyrene, divinylbenzene, 1,1-diphenylethylene, N,N-dimethyl-p-aminoethylstyrene, and N,N-diethyl-p-aminoethylstyrene. A recommended proportion of the vinyl aromatic compound is less than 5% by weight, preferably 4% by weight or less, still preferably 3% by weight or less.

A conjugated diene polymer to be hydrogenated in the present invention is obtained by, for example, anionic living polymerization in a hydrocarbon solvent in the presence of an organic alkali metal compound or a like initiator. The hydrocarbon solvent includes aliphatic hydrocarbons, e.g., n-butane, isobutane, n-pentane, n-hexane, n-heptane, and n-octane; alicyclic hydrocarbons, e.g., cyclohexane, cycloheptane, and methylcycloheptane; and aromatic hydrocarbons, e.g., benzene, toluene, xylene, and ethylbenzene.

The initiator includes aliphatic hydrocarbon alkali metal compounds, aromatic hydrocarbon alkali metal compounds, and organic amine alkali metal compounds, which are known to generally have anion polymerization activity on conjugated diene compounds. The alkali metal includes lithium, sodium, and potassium. Suitable organic alkali metal compounds are aliphatic and aromatic hydrocarbon lithium compounds having 1 to 20 carbon atoms, which include compounds containing one lithium atom per molecule and compounds containing two or more lithium atoms per molecule, e.g., dilithium compounds, trilithium compounds, and tetralithium compounds. Specific examples thereof are n-propyllithium, n-butyllithium, sec-butyllithim, t-butyllithium, n-pentyllithium, n-hexyllithium, benzyllithium, phenyllithium, tolyllithium, a reaction product of diisopropenylbenzene and sec-butyllithium, and a reaction product of divinylbenzene, sec-butyllithium, and a small amount of 1,3-butadiene. Additionally 1-(t-butoxy) propyllithium and a derivative thereof obtained by introducing one to several molecules of an isoprene monomer for improving solubility, which are disclosed in U.S. Pat. No. 5,708,092, siloxy-containing alkyllithium compounds such as 1-(t-butyldimethylsiloxy)hexyllithium disclosed in British Patent 2,241,239, amino-containing alkyllithium compounds disclosed in U.S. Pat. No. 5,527,753, and aminolithium compounds such as lithium diisopropylamide and lithium hexamethyldisilazide.

In polymerizing a conjugated diene compound using an organic alkali metal compound as a polymerization initiator, a tertiary amine compound or an ether compound can be added as a vinyl content modifier to increase the vinyl bond (1,2-bond or 3,4-bond) content which is originated in the conjugated diene compound and incorporated into the polymer. The tertiary amine compound includes those represented by the general formula: $R^1R^2R^3N$, wherein $R^1$, $R^2$, and $R^3$ are each a hydrocarbon group having 1 to 20 carbon atoms or a hydrocarbon group having a tertiary amino group, such as trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N",N"-pentamethylethylenetriamine, and N,N'-dioctyl-p-phenylenediamine.

The ether compound is chosen from straight-chain ether compounds and cyclic ether compounds. The straight-chain ether compounds include dimethyl ether, diethyl ether, diphenyl ether, dialkyl ethers of ethylene glycol, e.g., ethylene glycol dimethyl ether, ethylene glycol diethyl ether, and ethylene glycol dibutyl ether, and dialkyl ethers of diethylene glycol, e.g., diethylene glycol dimethyl ether, diethylene glycol diethyl ether, and diethylene glycol dibutyl ether. The cyclic ether compounds include tetrahydrofuran, dioxane, 2,5-dimethyloxirane, 2,2,5,5-tetramethyloxirane, 2,2-bis(2-oxiranyl)propane, and an alkyl ether of furfuryl alcohol.

The polymerization of a conjugated diene compound in the presence of an organic alkali metal compound as a polymerization initiator can be carried out in a batch or a continuous system or a combination thereof. Continuous polymerization is preferred for molecular weight distribution control within the range specified in the invention. The polymerization temperature is usually 0° to 180° C., preferably 30° to 150° C. Isothermal polymerization is preferred for minimizing the maximum-minimum difference of the vinyl bond content of the polymer. While varying according to the other conditions, the time required for the polymerization is usually within 48 hours, preferably 0.1 to 10 hours. The atmosphere of the polymerization system is preferably an inert gas atmosphere of nitrogen gas, etc. The polymerization pressure is not particularly limited as long as it is sufficient for maintaining the monomer and the solvent in a liquid phase within the above-described polymerization temperature range. Care should be taken so that any impurity that can deactivate the catalyst and the living polymer, such as water, oxygen and carbon dioxide, may not enter the polymerization system.

In order to control the molecular weight distribution within the range of the invention a requisite amount of a coupling agent having bi- or higher functionality can be added at the end of the polymerization to induce coupling reaction. Any known bifunctional coupling agent can be used with no particular restriction. Examples of useful bifunctional coupling agents include dihalogen compounds, such as dimethyldichlorosilane and dimethyldibromosilane, and acid esters, such as methyl benzoate, ethyl benzoate, phenyl benzoate, and phthalic esters. Any known tri- or higher functional coupling agent can be used with no particular restriction. Useful tri- or higher functional coupling agents include tri- or higher hydric polyalcohols; polyepoxy compounds, such as epoxidized soybean oil, diglycidyl bisphenol A, and 1,3-bis(N,N'-diglycidylaminomethyl)cyclohexane; and polyhalogen compounds, such as halogenated silicon compounds represented by the general formula: $R_{4-n}SiX_n$ (wherein R represents a hydrocarbon group having 1 to 20 carbon atoms, X represents a halogen atom; and n represents an integer of 3 or 4), e.g., methylsilyl trichloride, t-butylsilyl trichloride, silicon tetrachloride, and bromides corresponding to these chlorides, and halogenated tin compounds represented by the general formula: $R_{4-n}SnX_n$ (wherein R represents a hydrocarbon having 1 to 20 carbon atoms; X represents a halogen; and n represents an integer of 3 or 4), e.g., methyltin trichloride, t-butyltin trichloride, and tin tetrachloride. Dimethyl carbonate, diethyl carbonate, and the like are also useful.

In the present invention a terminal modified conjugated diene polymer which is a conjugated diene polymer having a polar group-containing atomic group bonded to at least one terminal thereof can be used as a conjugated diene polymer. The polar group-containing atomic group includes atomic groups containing at least one kind of polar groups selected from a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylic acid ester group, an amido group, a sulfonic acid group, a sulfonic ester group, a phosphonic acid group, a phosphonic ester group, an amino group, an imino group, a nitrile group, a pyridyl group, a quinoline group, an epoxy group, a thioepoxy group, a sulfide group, an isocyanate group, an isothiocyanate group, a silicon halide group, an alkoxysilicon group, a tin halide group, an alkoxytin group, a phenyltin group, etc. The terminal modified conjugated diene polymer is obtained by allowing a compound having the polar group-containing atomic group to react at the end of polymerization for preparing a conjugated diene polymer. The compound having a polar group-containing atomic group which can be used includes the terminal modifiers described in JP-B-4-39495.

The hydrogenated polymer of the present invention is obtained by hydrogenating the thus obtained conjugated diene polymer. Catalysts for hydrogenation which can be used are not particularly limited and include those conventionally known, such as (1) heterogeneous catalyst-on-carrier types composed of Ni, Pt, Pd, Ru or a like metal carried on carbon, silica, alumina, diatomaceous earth, etc., (2) so-called Zieglar types comprised of a transition metal salt, e.g., an organic acid salt or an acetylacetone salt of Ni, Co, Fe, Cr, etc. and a reducing agent, e.g., an organoaluminum, and (3) homogeneous types, such as organic metal complexes, e.g., organometallic compounds of Ti, Ru, Rh, Zr, etc. More specifically, the hydrogenation catalysts described in JP-B-42-8704, JP-B-43-6636, JP-B-63-4841, JP-B-1-37970, JP-B-1-53851, and JP-B-2-9041 can be used. A titanocene compound and/or a mixture with a reducing organometallic compound are preferred hydrogenation catalysts.

The titanocene compound which can be used includes the compounds described in JP-A-8-109219, such as those having at least one ligand having a (substituted) cyclopentadienyl skeleton, an indenyl skeleton or a fluorenyl skeleton, e.g., biscyclopentadienyltitanium dichloride and monopentamethylcyclopentadienyltitanium trichloride. The reducing organometallic compound includes organic alkali metal compounds, e.g., organic lithium, organomagnesium compounds, organoaluminum compounds, organoboron compounds, and organozinc compounds.

The hydrogenation reaction of the present invention is generally carried out in a temperature range of from 0 to 200° C., preferably 30 to 150° C. A recommended hydrogen pressure used for the hydrogenation reaction is from 0.1 to 15 MPa, preferably 0.2 to 10 MPa, still preferably 0.3 to 5 MPa. The hydrogenation reaction time is usually 3 minutes to 10 hours, preferably 10 minutes to 5 hours. The hydrogenation reaction can be effected in any of a batch process, a continuous process, or a combination thereof.

The catalyst is removed from the resulting hydrogenated polymer solution if necessary, and the hydrogenated polymer is separated from the solution. The solvent is separated by, for example, a method comprising adding a polar solvent which is a poor solvent for the hydrogenated polymer, such as acetone or an alcohol, to the reaction solution after the hydrogenation, to precipitate the polymer and recovering the solvent, a method comprising pouring the reaction solution into hot water while stirring and removing and recovering the solvent by steam stripping, or a method comprising directly heating the polymer solution to evaporate the solvent. To the hydrogenated polymer of the present invention can be added stabilizers of various kinds, such as phenol type stabilizers, phosphorus type stabilizers, sulfur type stabilizers, and amine type stabilizers.

The hydrogenated polymer of the invention can be modified with an α,β-unsaturated carboxylic acid or a derivative thereof, such as an anhydride, an ester, an amide or an imide. Examples of the α,β-unsaturated carboxylic acid and its derivative are maleic anhydride, maleimide, acrylic acid or an ester thereof, methacrylic acid or an ester thereof, and endo-cis-bicyclo[2,2,1]-5-heptene-2,3-dicarboxylic acid or an anhydride thereof. The α,β-unsaturated carboxylic acid or a derivative thereof is usually added in an amount of 0.01 to 20 parts by weight, preferably 0.1 to 10 parts by weight, per 100 parts by weight of the hydrogenated polymer.

It is preferred for the hydrogenated polymer of the present invention to have a melt flow ratio of 4 to 30, preferably 5 to 25, still preferably 6 to 20, from the standpoint of processability. The term "melt flow ratio" as used herein means a ratio of a melt flow (F1) measured at 190° C. and 10 kg load to a melt flow (F2) measured at 190° C. and 2.16 kg load, F1/F2.

The vinyl bond content in the conjugated diene polymer before hydrogenation which is originated in the conjugated diene compound can be determined with an infrared spectrophotometer (e.g., Morello method), a nuclear magnetic resonance (NMR) apparatus, etc. The degree of hydrogenation of the hydrogenated polymer can be determined with an infrared spectrophotometer, an NMR apparatus, etc. In the present invention, the "molecular weight" of the hydrogenated polymer is a weight average molecular weight obtained by conducting gel-permeation chromatography (GPC) and obtaining the molecular weight of the peak of the chromatogram by using a calibration curve prepared from commercially available polystyrene standards (prepared by using peak molecular weights of the polystyrene standards). Where the chromatogram has a plurality of peaks, an average molecular weight is obtained from the molecular weights of the peaks and the composition ratio of the peaks (obtained from the peak area ratio of the chromatogram). The molecular weight distribution of the hydrogenated polymer is similarly obtained by GPC measurement.

Blending (a) 1 to 99 parts by weight, preferably 2 to 90 parts by weight, still preferably 5 to 70 parts by weight, of the hydrogenated polymer of the invention and (b) 1 to 99 parts by weight, preferably 10 to 98 parts by weight, still preferably 30 to 95 parts by weight, of (b-1) a thermoplastic resin and/or (b-2) a rubbery polymer provides compositions suitable for various molding materials. Where, in particular, a resin composition excellent in impact resistance, rigidity, and the like is desired, it is preferred to use at least 3 parts by weight of component (b-1). Where component (a) is combined with component (b-2) in place of a thermoplastic resin, a rubber-like composition is obtained. In this case, component (b-2) is preferably used in an amount of at least 3 parts by weight.

The thermoplastic resins include block copolymers comprising a conjugated diene compound and a vinyl aromatic compound; polymers of the above-described vinyl aromatic compounds; copolymer resins of the above-described vinyl aromatic compounds and other vinyl monomers, such as ethylene, propylene, butylene, vinyl chloride, vinylidene chloride, vinyl acetate, acrylic acid, acrylic esters, e.g., methyl acrylate, methacrylic acid, methacrylic esters, e.g., methyl methacrylate, acrylonitrile, and methacrylonitrile; rubber-modified styrene resins (HIPS), acrylonitrile-butadiene-styrene copolymer resins (ABS), methacrylic ester-butadiene-styrene copolymer resins (MBS); polyethylene resins, such as polyethylene, copolymers comprising 50% by weight or more of ethylene and other copolymerizable monomers, e.g., ethylene-propylene copolymers, ethylene-butylene copolymers, ethylene-hexene copolymers, ethylene-octene copolymers, ethylene-vinyl acetate copolymers and hydrolyzates thereof, ethylene-acrylic acid ionomers, and chlorinated polyethylene; polypropylene resins, such as polypropylene, copolymers comprising 50% by weight or more of propylene and other copolymerizable monomers, e.g., propylene-ethylene copolymers and propylene-ethyl acrylate copolymers, and chlorinated polypropylene; cyclic olefin resins, such as ethylene-norbornene resins; polybutene resins, polyvinyl chloride, polyvinylidene chloride, polyvinyl chloride resins, polyvinyl acetate resins and hydrolyzates thereof, polymers of acrylic acid or an ester or an amide thereof, polymers of methacrylic acid or an ester or an amide thereof, polyacrylate resins, acrylonitrile and/or methacrylonitrile polymers, nitrile resins comprising 50% by weight or more of these acrylonitrile monomers and other copolymerizable monomers; polyamide resins, e.g., nylon-46, nylon-6, nylon-66, nylon-610, nylon-11, nylon-12, and nylon-6/nylon-12 copolymers; polyester resins, thermoplastic polyurethane resins; polycarbonate resins, e.g., poly-4,4'-dihydroxydiphenyl-2,2'-propane carbonate; thermoplastic polysulfones, e.g., polyether sulfone and polyallyl sulfone; polyoxymethylene resins; polyphenylene ether resins, e.g., poly(2,6-dimethyl-1,4-phenylene) ether; polyphenylene sulfide resins, e.g., polyphenylene sulfide and poly-4,4'-diphenylene sulfide; polyarylate resins; polyether ketone polymers or copolymers, polyketone resins, fluorine resins, polyhydroxybenzoyl polymers, polyimide resins; and polybutadiene resins, e.g., 1,2-polybutadiene and trans-polybutadiene. These thermoplastic resins generally have a number average molecular weight of 1000 or more, preferably 5,000 to 5,000,000, still preferably 10,000 to 1,000,000. These thermoplastic resins can be used as a combination of two or more thereof.

The rubbery polymers include butadiene rubber and its hydrogenation products (different from the hydrogenated polymer of the invention), styrene-butadiene rubber and its hydrogenation products, isoprene rubber, acrylonitrile-butadiene rubber and its hydrogenation products, chloroprene rubber; olefin elastomers, e.g., ethylene-propylene rubber, ethylene-propylene-diene rubber, ethylene-butene-diene rubber, ethylene-butene rubber, ethylene-hexene rubber, and ethylene-octene rubber; butyl rubber, acrylic rubber, fluororubber, silicone rubber, chlorinated polyethylene rubber, epichlorohydrin rubber, α,β-unsaturated nitrile-acrylic ester-conjugated diene copolymer rubber, urethane rubber, polysulfide rubber; styrene elastomers, e.g., styrene-butadiene block copolymers and their hydrogenation products and styrene-isoprene block copolymers and their hydrogenation products; and natural rubber. These rubbery polymers may be functional group-modified rubbers.

If desired, the hydrogenated polymer and the composition comprising the hydrogenated polymer and the thermoplastic resin and/or the rubbery polymer according to the present invention can contain arbitrary additives. Any kinds of additives that are customarily employed in compounding thermoplastic resins or rubber polymers can be used with no particular restriction. Useful additives include inorganic fillers, such as silica, calcium carbonate, magnesium carbonate, magnesium hydroxide, calcium sulfate, barium sulfate, talc, mica, silicic acid (white carbon), and titanium oxide; pigments, such as carbon black and iron oxide; lubricants or parting agents, such as stearic acid, behenic acid, zinc stearate, calcium stearate, magnesium stearate, and ethylenebisstearamide; plasticizers, such as organopolysiloxanes and mineral oil; antioxidants, such as hindered phenol antioxidants and phosphorous thermal stabilizers; hindered amine photo stabilizers; benzotriazole ultraviolet absorbers; flame retardants; antistatic agents; reinforcing agents, such as organic fibers, glass fiber, carbon fibers, and metal whiskers; colorants; and others; and mixtures thereof.

The polymer composition of the present invention can be prepared by known techniques with no particular restriction. For example, a melt-kneading method by use of common kneading machines, e.g., a Banbury mixer, a single-screw extruder, a twin-screw extruder, a co-kneader, and a multi-screw extruder, or a method comprising mixing solutions or dispersions of each component followed by solvent removal by heating. A melt-kneading method by use of an extruder is preferred from the standpoint of productivity and kneading results.

The hydrogenated polymer and the composition comprising the hydrogenated polymer and the thermoplastic resin and/or the rubbery polymer according to the present invention are made use of as they are or as mixed with various additives in the manufacture of a wide variety of moldings and formings of various shapes, including sheets, films, injection-molded or blow-molded articles, pressure-formed or vacuum-formed articles, extruded articles, nonwoven fabrics, and fibrous articles. These moldings and formings can be used as food packaging materials, medical equipment materials, domestic appliances and parts therefor, materials for automobile parts, industrial parts, utensils, toys, etc., materials for footwear, materials for adhesives, asphalt modifiers, and the like.

In particular, sheets or films containing the specific hydrogenated polymer of the invention are especially excellent in low-temperature impact resistance and film properties such as transparency. In the case of a film prepared from polypropylene having a hydrogenated polymer added thereto, the film will be excellent in impact resistance and transparency where the hydrogenated polymer added is one prepared from a polymer whose vinyl bond content before hydrogenation is less than 40% by weight as in the present invention. Similarly, where the hydrogenated polymer is one whose crystallizing peak temperature and hydrogenated vinyl bond content satisfy the relationship specified in the present invention, the film will be satisfactory in impact resistance and transparency.

Accordingly, the film or sheet of the present invention is fit for broad applications such as packaging films for various foods, utensils or personal articles, and clothing, e.g., shirts, protective films, a base of pressure-sensitive adhesives, and sheeting for frozen food containers.

The present invention will now be illustrated in greater detail with reference to the following Examples, but the present invention should not be construed as being limited thereto. In Examples, the characteristics and physical properties of polymers were measured as follows.

1. Characteristics and Physical Properties of Polymers
(1) Vinyl bond content and degree of hydrogenation:
Measured with a nuclear magnetic resonance apparatus DPX-4000 supplied by Bruker.
(2) Molecular weight and molecular weight distribution:
A polymer before hydrogenation was analyzed by GPC using an apparatus supplied by Waters. Tetrahydrofuran was used as a solvent. The measurement was made at a temperature of 35° C. The molecular weight is a weight average molecular weight obtained from the peak molecular weight of the chromatogram by using the calibration curve obtained from the measurements on commercially available polystyrene standards (prepared by using the peak molecular weights of polystyrene standards). Where the chromatogram has a plurality of peaks, an average molecular weight is obtained from the molecular weights of the peaks and the composition ratio of the peaks (obtained from the peak area ratio of the chromatogram). The molecular weight distribution is a weight average molecular weight to number average molecular weight ratio.
(3) Crystallizing peak temperature:
Measured with a DSC (DSC 3200S, supplied by MACK Science Co., Ltd.). The temperature was raised from room temperature up to 100° C. at a rate of 30° C./min and then dropped at a rate of 10° C./min to measure a crystallization curve, from which a crystallizing peak temperature (T) was obtained.
(4) Tensile strength of hydrogenated polymer:
Measured in accordance with JIS K6251.
(5) Processability of Hydrogenated Polymer:
Melt flow rate (MFR): a melt flow rate measured at 230° C. and 2.16 kg load in accordance with JIS K6758.
Melt flow ratio: a ratio of the melt flow measured at 190° C. and 10 kg load to that measured at 190° C. and 2.16 kg load in accordance with JIS K6758.
Polymers with a high melt flow rate and a high melt flow ratio were judged to have good processability.
2. Physical Properties of Hydrogenated Polymer Resinous Composition
A hydrogenated polymer, a thermoplastic resin, a rubber polymer, etc. were kneaded in a twin-screw extruder (PCM 30) and pelletized to prepare a composition. The extrusion was conducted at 210° C. and 200 rpm.
Components used were as follows.
Thermoplastic Resin
  Commercially available polypropylene resin (1) Block PP (MK711, available from Montel SDK Sunrise Co., Ltd.)
  Commercially available polyamide resin, nylon 6 (Amilan CM1017, available from Toray Industries, Inc.)
Rubbery Polymer (1)
  Commercially available hydrogenated block copolymer (Tuftec H1062, available from Asahi Chemical Industry Co., Ltd.)
  Commercially available ethylene-propylene rubber (EP02P, available from JSR Corp.)
Additive
  Talc (Micro-Ace P-4, available from Nippon Talc K.K.)
(6) Rigidity:
An injection molded specimen was subjected to bending test according to ASTM D790 to measure a flexural modulus.
(7) Impact resistance:
An Izod impact strength (notched) of an injection molded specimen was measured according to JIS K7110. The measuring temperature was −30° C. for polypropylene resin compositions and 23° C. for polyamide resin compositions.

(8) Heat aging resistance:

An injection molded specimen of a polymer composition was aged at 135° C. for 200 hours. An elongation at break in tension of the injection molded specimen was then measured according to ASTM D638. The pulling speed was 20 mm/min. An elongation retention with reference to the elongation of a sample that had not been aged at 135° C. for 200 hours was obtained. Samples with a higher retention were judged to have higher heat aging resistance.

(9) Processing characteristics:

Appearance of an injection molded article was observed with the naked eye and evaluated according to the following standard.

A: An injection molded article has a satisfactory appearance.

B: An injection molded article has flow marks.

C: An injection molded article has a poor appearance with flow marks and surface roughening.

3. Physical Properties of Film

A thermoplastic resin or a mixture of the thermoplastic resin and a hydrogenated polymer was extruded from a T-die to prepare a film. A T-die extruder having a 30 mm diameter screw (L/D=28) and a die dimension of 300×0.5 mm was used. Extrusion conditions were 230° C. in extruding temperature and 30° C. in roll temperature. The resulting film thickness was 50 μm.

Components used were as follows.

Thermoplastic Resin

Commercially available polypropylene resin (2):
Homo PP(PC600S, available from Sun Allomer Co., Ltd.)

(10) Film mpact:

Measured with a film impact tester (from Toyo Seiki Kogyo Co., Ltd.) with a head diameter of ½ inch at a measuring temperature of 0° C.

(11) Haze:

Measured with a haze meter (NDH-1001DP, from Nippon Denshoku Industries Co., Ltd.) according to JIS K6782. A lower haze was taken as a measure of higher transparency.

4. Physical Properties of Hydrogenated Polymer Rubbery Composition

A hydrogenated polymer and a rubbery polymer were fed to calender rolls to prepare a 0.5 mm thick sheet. The roll temperature was 200° C.

Components used were as follows.

Rubbery Polymer (2)

Commercially available hydrogenated block copolymer (Tuftec H1052, from Asahi Chemical)

Commercially available ethylene-octene rubber (KC8850, from The Dow Chemical Co.)

(12) Hardness:

Measured with a type A durometer according to JIS K6253.

(13) Tensile strength and elongation of sheet:

Measured in accordance with JIS K6251.

Hydrogenation catalysts used for hydrogenation reaction were prepared as follows.

(I) Hydrogenation Catalyst I:

One liter of purified cyclohexane was put into a reaction vessel having been purged with nitrogen, and 100 mmol of bis($\eta^5$-cyclopentadienyl)titanium dichloride was added thereto. An n-hexane solution containing 200 mmol of trimethylaluminum was added thereto while stirring thoroughly and allowed to react at room temperature for about 3 days.

(II) Hydrogenation Catalyst II:

Two liters of purified cyclohexane was put into a reaction vessel having been purged with nitrogen, and 40 mmol of bis($\eta^5$-cyclopentadienyl)di(p-tolyl)titanium and 150 g of 1,2-polybutadiene (1,2-vinyl bond content: ca. 85%) having a molecular weight of about 1000 were added and dissolved therein. A cyclohexane solution containing 60 mmol of n-butyllithium was added and allowed to react at room temperature for 5 minutes. Immediately thereafter, 40 mmol of n-butanol was added thereto, followed by stirring, and the resulting mixture was stored at room temperature.

REFERENCE EXAMPLES

In order to clarify the relationship between polymerization temperature and average vinyl bond content or vinyl bond content distribution, batch polymerization was carried out to collect basic data.

Reference Example 1

In a 10 liter-volume (L/D=4) jacketed tank reactor equipped with a stirrer were put 3.3 l of cyclohexane, 5.0 ml of a 15 wt % n-butyllithium solution in cyclohexane, and 0.25 mol, per mole of n-butyllithium, of N,N,N',N'-tetramethylethylenediamine. The inner temperature of the reactor was set at 85° C., and a 10 wt % butadiene solution in cyclohexane was fed to the reactor at a rate of 120 ml/min to conduct polymerization. The reactor's inner temperature was controlled within 85±1° C. by the jacket temperature. On feeding 250 g of butadiene to the reactor, the feed of the cyclohexane solution of butadiene was stopped. The conversion of butadiene after about 15 minutes was approximately 100%.

The resulting polymer had a vinyl bond content of 28 wt %. The polymer's vinyl bond content measured during the progress of polymerization (immediately after and 5 minutes after stopping feeding butadiene) was 28 wt % and 29 wt %, respectively.

Reference Example 2

Polymerization, sampling, and vinyl bond measurement were carried out in the same manner as in Reference Example 1, except that the inner temperature was controlled within 90±1° C. The results obtained are shown in Reference Table 1, and the relationship between polymerization temperature and vinyl bond content is shown in FIG. 1.

Reference Example 3

Polymerization, sampling, and vinyl bond measurement were carried out in the same manner as in Reference Example 1, except that the inner temperature was controlled within 95±1° C. The results obtained are shown in Reference Table 1, and the relationship between polymerization temperature and vinyl bond content is shown in FIG. 1.

Reference Example 4

Polymerization, sampling, and vinyl bond measurement were carried out in the same manner as in Reference Example 1, except that N,N,N',N'-tetramethylethylenediamine was added in an amount of 0.35 mol per mole of n-butyllithium. The results obtained are shown in Reference Table 1, and the relationship between polymerization temperature and vinyl bond content is shown in FIG. 1.

Reference Example 5

Polymerization, sampling, and vinyl bond measurement were carried out in the same manner as in Reference Example 4, except that the inner temperature was controlled within 90±1° C. The results obtained are shown in Reference Table 1, and the relationship between polymerization temperature and vinyl bond content is shown in FIG. 1.

Reference Example 6

Polymerization, sampling, and vinyl bond measurement were carried out in the same manner as in Reference Example 4, except that the inner temperature was controlled within 95±1° C. The results obtained are shown in Reference Table 1, and the relationship between polymerization temperature and vinyl bond content is shown in FIG. 1.

It can be seen from the above results that polymerization temperature and vinyl bond content are substantially in a linear relationship and that the vinyl bonds can be uniformly distributed in the polymer chain when the temperature is unchanged during polymerization.

REFERENCE TABLE 1

| Reference Example No. | Amount of Diamine (mol/Li) | Polymerzation Temp. (° C.) | Vinyl Bond Content (%) | | |
|---|---|---|---|---|---|
| | | | Sample 1*1 | Sample 2*2 | Sample 3*3 |
| 1 | 0.25 | 85 | 28 | 29 | 28 |
| 2 | 0.25 | 90 | 25 | 25 | 25 |
| 3 | 0.25 | 95 | 22 | 23 | 22 |
| 4 | 0.35 | 85 | 33 | 33 | 33 |
| 5 | 0.35 | 90 | 29 | 30 | 30 |
| 6 | 0.35 | 95 | 27 | 28 | 28 |

*1Immediately after stopping butadiene feed
*2After 5 mins from stopping butadiene feed
*3Final product Example 1

To a 10 liter-volume (L/D=4) jacketed tank reactor equipped with a stirrer were fed a 20 wt % solution of butadiene in cyclohexane at a feed rate of 6.19 l/hr, a cyclohexane solution containing n-butyllithium in a concentration adjusted to furnish 0.145 g of n-butyllithium per 100 g of butadiene at a feed rate of 2 l/hr, and a cyclohexane solution of N,N,N',N'-tetramethylethylenediamine at a feed rate adjusted to afford 0.25 mol of the solute per mole of n-butyllithium to carry out continuous polymerization at 90° C. The reaction temperature was controlled by the jacket temperature so that the temperatures of the reaction system near the reactor's bottom, middle, and top were about 88° C., about 90° C., and about 90° C., respectively. The average retention time in the reaction vessel was about 45 minutes, and the butadiene conversion was approximately 100%.

The polymer obtained by the continuous polymerization had an average vinyl bond content of 25 wt %. A sample withdrawn from near the reactor's bottom during the continuous polymerization was found to have a vinyl bond content of 26 wt %. The difference between maximum and minimum vinyl bond contents in the polymer obtained by continuous polymerization is not more than 2 wt % as was calculated from the results of Reference Examples. As a result of GPC, the average molecular weight was 201,000. There was a single peak, and the molecular weight distribution was 1.9.

Figure 2:
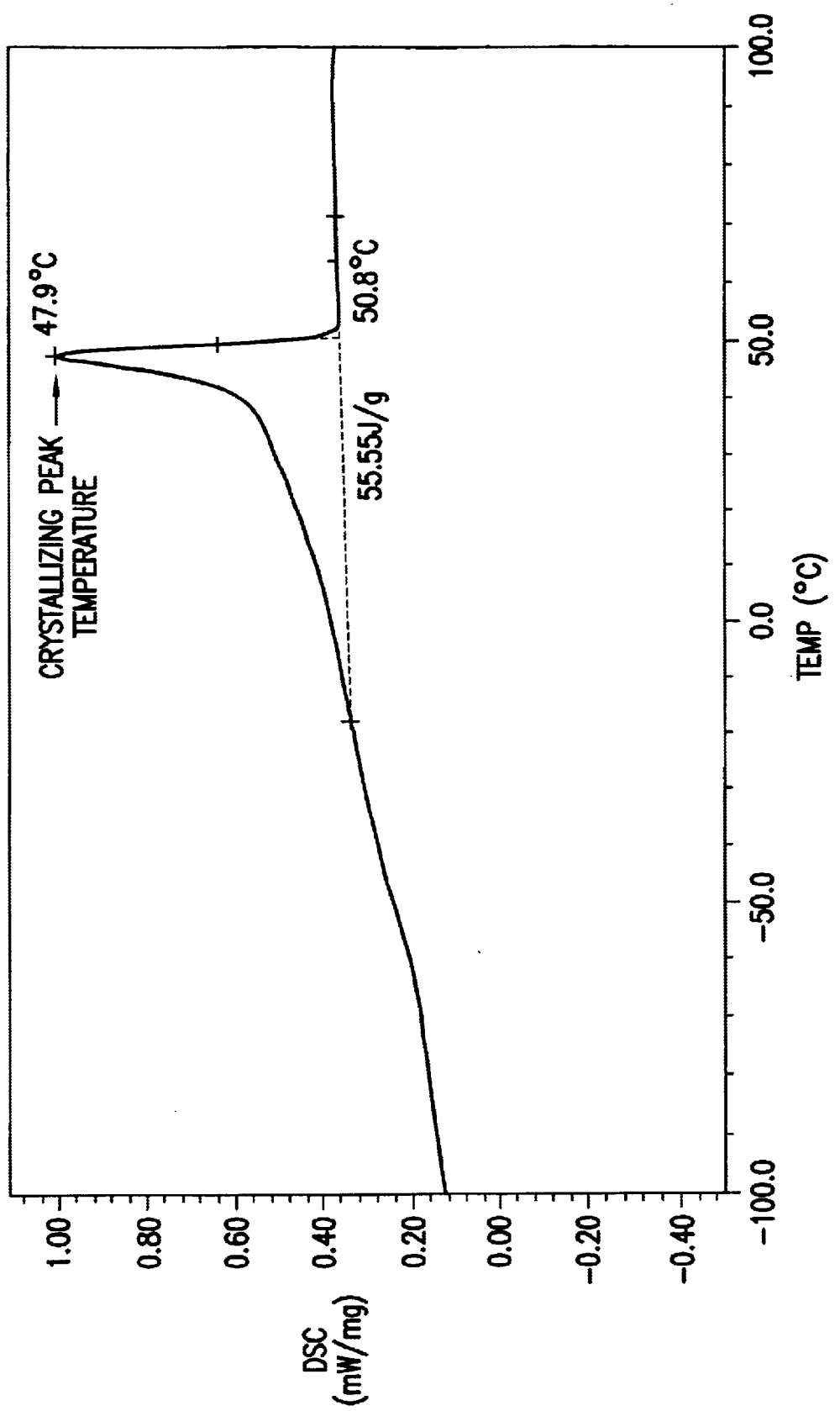
FIG. 2 is a DSC thermogram of the hydrogenated polymer of Example 1 showing the crystallizing peak temperature.

Hydrogenation catalyst I was added to the polymer obtained by the continuous polymerization in an amount of 100 ppm in terms of Ti per 100 parts by weight of the polymer, and hydrogenation reaction was conducted at a hydrogen pressure of 0.7 MPa and a temperature of 65° C. The DSC thermogram of the resulting hydrogenated polymer is shown in FIG. 2.

Figure 3:
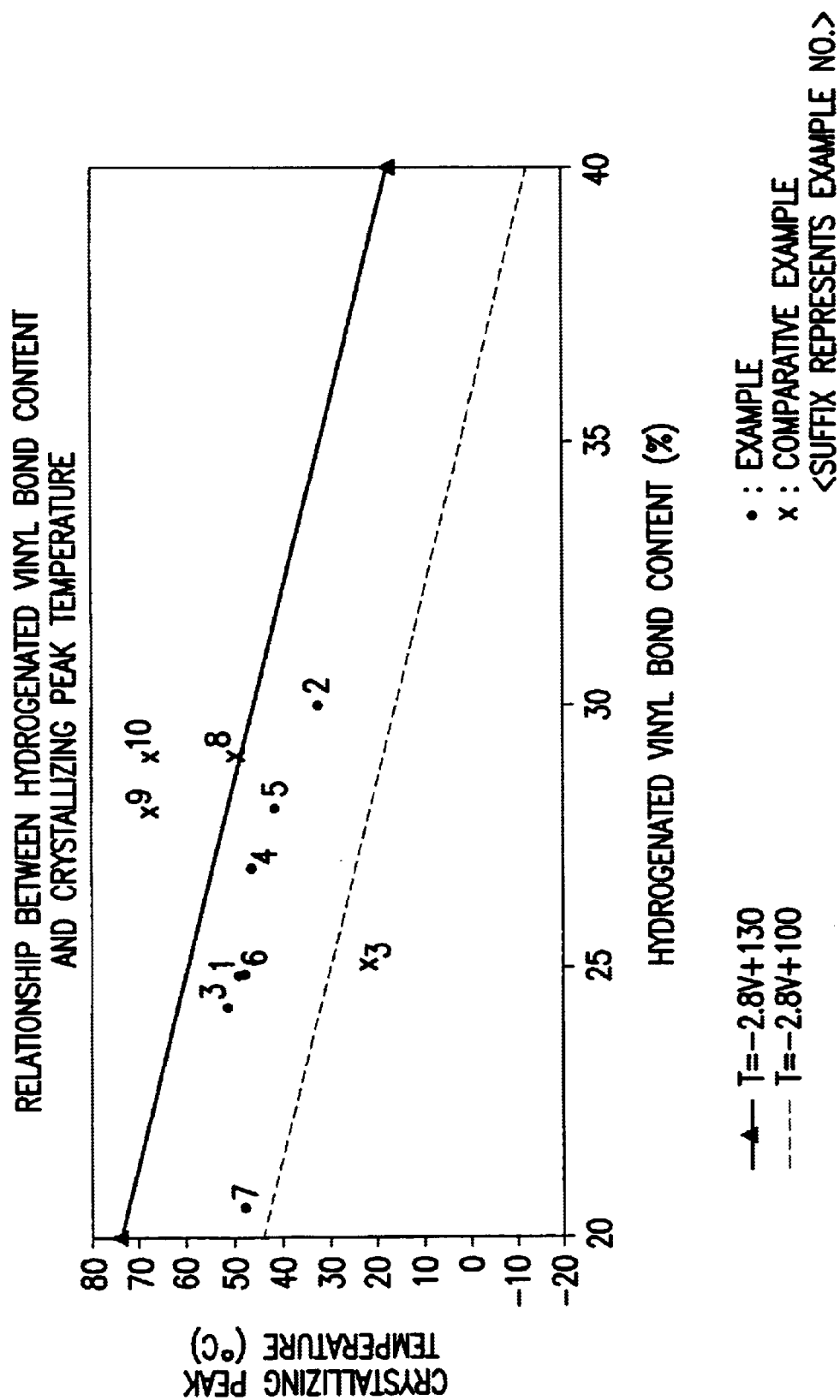
FIG. 3 shows the relationship between hydrogenated vinyl bond content and crystallizing peak temperature in the hydrogenated polymers of Examples and Comparative Examples.

The characteristics of the resulting hydrogenated polymer (polymer 1) are shown in Table 1, in which "average vinyl bond content" and "difference between maximum and minimum vinyl bond contents" are simply referred to as "vinyl content" and "max-min vinyl difference", respectively. The relationship between hydrogenated vinyl bond content and crystallizing peak temperature is shown in FIG. 3.

Example 2

Continuous polymerization was carried out in the same manner as in Example 1, except for changing the feed of n-butyllithium to 0.10 g per 100 g of butadiene and changing the feed of N,N,N',N'-tetramethylethylenediamine to 0.35 mol/Li. The resulting polymer was hydrogenated in the same manner as in Example 1, except for using hydrogenation catalyst II, to obtain a hydrogenated polymer (polymer 2). The characteristics of the hydrogenated polymer are shown in Table 1. The relationship between hydrogenated vinyl bond content and crystallizing peak temperature is shown in FIG. 3.

Comparative Example 1

Continuous polymerization was carried out in the same manner as in Example 1, except that N,N,N',N'-tetramethylethylenediamine was not used, and the resulting polymer was hydrogenated in the same manner as in Example 1 in an attempt to obtain a hydrogenated polymer (polymer 3). However, the viscosity increased abnormally during hydrogenation reaction, making agitation impossible and resulting in a failure to perform normal hydrogenation reaction.

Comparative Example 2

Continuous polymerization and subsequent hydrogenation reaction were carried out in the same manner as in Example 1, except for changing the feed of N,N,N',N'-tetramethylethylenediamine. The characteristics of the resulting hydrogenated polymer (polymer 4) are shown in Table 1.

Comparative Example 3

A hydrogenated polymer (polymer 5) was obtained in the same manner as in Example 1, except for changing the degree of hydrogenation to 70%. The characteristics of the polymer are shown in Table 1. The relationship between hydrogenated vinyl bond content and crystallizing peak temperature is shown in FIG. 3.

Comparative Examples 4 and 5

Continuous polymerization was carried out in the same manner as in Example 2, except for changing the feeds of n-butyllithium and N,N,N',N'-tetramethylethylenediamine. Thereafter, hydrogenation reaction was performed in the same manner as in Example 2. The characteristics of the resulting hydrogenated polymers (polymers 6 and 7) are shown in Table 1.

Example 3

Continuous polymerization was performed by using two 5 liter-volume (L/D=4) jacketed tank reactors equipped with a stirrer. To the first reactor were fed at the bottom thereof a 20 wt % cyclohexane solution of butadiene at a feed rate of 3.1 l/hr, a cyclohexane solution containing 0.145 g, per 100 g of butadiene, of n-butyllithium at a feed rate of 2 l/hr, and a cyclohexane solution of N,N,N',N'-tetramethylethylenediamine at a rate to feed 0.25 mol of the solute per mole of n-butyllithium, and polymerization was conducted continuously at 90° C. The reaction temperature was controlled by the jacket temperature so that the temperatures of the reaction system near the reactor's bottom and top were about 88° C. and about 90° C., respectively. The butadiene conversion at the outlet of the first reactor was approximately 100%. A polymer sample withdrawn at the outlet of the reactor had a vinyl bond content of 25 wt %. The polymer solution from the first reactor was fed to the bottom of the second reactor. Simultaneously, a 20 wt % butadiene solution in cyclohexane was fed to the bottom of the second reactor at a feed rate of 3.1 l/hr, and the system was polymerized continuously at 90° C. The temperatures near the bottom and the top of the second reactor were about 89° C. and about 90° C., respectively. The butadiene conversion at the outlet of the second reactor was almost 100%. The resulting polymer had a vinyl bond content of 24 wt %. The vinyl bond content of the polymer formed in the second reactor was 23 wt %.

Hydrogenation reaction was carried out in the same manner as in Example 1. The characteristics of the resulting hydrogenated polymer (polymer 8) are shown in Table 1. The relationship between hydrogenated vinyl bond content and crystallizing peak temperature is shown in FIG. 3.

Example 4

In a 10 liter-volume (L/D=4) jacketed tank reactor equipped with a stirrer were put 3.3 l of cyclohexane, 14.1 ml of a 15 wt % solution of n-butyllithium in cyclohexane, and 0.27 mol, per mole of n-butyllithium, of N,N,N',N'-tetramethylethylenediamine. The inner temperature of the reactor was set at 90° C., and a 30 wt % butadiene solution in cyclohexane was fed to the reactor at a rate of 120 ml/min to conduct polymerization. The inner temperature of the reactor was controlled by the jacket temperature so as to fall within 90±3° C. On feeding 395 g of butadiene to the reactor, the feed of cyclohexane solution of butadiene was stopped. About 15 minutes later, the conversion of butadiene substantially reached 100%. At this point of time, silicon tetrachloride was put into the reactor in an amount of ⅛ mol per mole of n-butyllithium to conduct coupling reaction. Ten minutes later, the inner temperature of the reactor was again set at 90° C., and a 30 wt % butadiene solution in cyclohexane was fed to the reactor at a rate of 120 ml/min to resume polymerization. The inner temperature of the reactor was controlled within 90±3° C. by the jacket temperature. When the amount of butadiene additionally fed to the reactor reached 395 g, the feed of cyclohexane solution of butadiene was stopped. About 15 minutes later, the butadiene conversion was almost 100%. After completion of the polymerization reaction, ⅛ mol, per mole of n-butyllithium, of silicon tetrachloride was put into the reactor to carry out coupling reaction.

The resulting polymer had an average vinyl bond content of 27 wt %. The difference between the vinyl bond contents of polymer samples collected during the polymerization reaction and the vinyl bond content obtained from the polymer conversion (degree of conversion to a polymer based on the total butadiene finally fed), which was calculated from the butadiene feed at the time of sampling and the reaction rate, was not more than 5% by weight.

Hydrogenation reaction was carried out by using hydrogenation catalyst I in the same manner as in Example 1. The characteristics of the resulting hydrogenated polymer (polymer 9) are shown in Table 1. The relationship between hydrogenated vinyl bond content and crystallizing peak temperature is shown in FIG. 3.

Comparative Example 6

A hydrogenated polymer (polymer 10) was obtained in the same manner as in Example 4, except that the amount of n-butyllithium added was changed, and coupling reaction was not carried out. The characteristics of the resulting hydrogenated polymer are shown in Table 1.

Comparative Example 7

Polymerization reaction and hydrogenation reaction were carried out in the same manner as in Example 4, except that the amounts of n-butyllithium and N,N,N',N'-tetramethylethylenediamine were changed and that silicon tetrachloride and butadiene were added in an increased number of divided portions, to obtain a hydrogenated polymer (polymer 11). The characteristics of the resulting hydrogenated polymer are shown in Table 1.

Comparative Example 8

In a 10 liter-volume (L/D=4) jacketed tank reactor equipped with a stirrer were put 3.3 l of cyclohexane, 14.1 ml of a 15 wt % solution of n-butyllithium in cyclohexane, and 0.22 mol, per mole of n-butyllithium, of N,N,N',N'-tetramethylethylenediamine. The inner temperature of the reactor was set at 40° C., and a 30 wt % butadiene solution in cyclohexane was fed to the reactor to carry out batch process polymerization. An aliquot of the polymer solution was taken one minute later from the start of feeding, and the vinyl bond content of the polymer was measured. At this time point, the vinyl bond content was 44 wt %, and the polymerization temperature was 50° C. On feeding 790 g of butadiene to the reactor, the feed of the cyclohexane solution of butadiene was stopped. The feeding time was about 5 minutes, and the highest temperature reached during the polymerization was 90° C. After about 15 minutes, the butadiene conversion reached almost 100%.

The resulting polymer had an average vinyl bond content of 29 wt %.

Then, the polymer was hydrogenated in the same manner as in Example 1. The characteristics of the resulting hydrogenated polymer (polymer 12) are shown in Table 1. The relationship between hydrogenated vinyl bond content and crystallizing peak temperature is shown in FIG. 3.

Example 5

Polymerization reaction was carried out in the same manner as in Example 4 to obtain a polymer, except that the amount of n-butyllithium added was changed to 7.9 ml and that the coupling reaction was not conducted. The resulting polymer had an average vinyl bond content of 28 wt %, and the difference between maximum and minimum vinyl bond contents in the polymer was within 5 wt %. Thereafter hydrogenation reaction was performed in the same manner as in Example 4 to obtain a hydrogenated polymer (polymer 13). The hydrogenated polymer had a weight average molecular weight of 72,000 and a molecular weight distribution of 1.1. The degree of hydrogenation was 99%.

The same procedure was repeated except for changing the amount of n-butyllithium added to 2.8 ml to obtain a high-molecular weight hydrogenated polymer (polymer 14). The polymer had a weight average molecular weight of 310,000 and a molecular weight distribution of 1.1. The degree of hydrogenation was 99%.

A cyclohexane solution of polymer 13 and a cyclohexane solution of polymer 14 were mixed in a ratio of 50%/50%, and the solvent was removed. The physical properties of the polymer were measured. The results are shown in Table 1. The relationship between hydrogenated vinyl bond content and crystallizing peak temperature is shown in FIG. 3.

Comparative Example 9

A hydrogenated polymer was obtained by the following method. The polymer was made up of segments having different vinyl bond contents, the difference in vinyl bond content exceeding the range of the present invention.

In a first reaction step, 3.3 l of cyclohexane, 13.4 ml of a 15 wt % n-butyllithium solution in cyclohexane, and 0.02 mol, per mole of n-butyllithium, of N,N,N',N'-tetraethylenediamine were put into a 10 liter-volume (L/D=4) jacketed tank reactor equipped with a stirrer. Then the inner temperature of the reactor was set at 90° C., and a 30 wt % butadiene solution in cyclohexane was fed to the reactor at a rate of 120 ml/min to perform polymerization. The inner temperature of the reactor was controlled within 90±3° C. by the jacket temperature. When the amount of butadiene fed to the reaction reached 395 g, the feed of the cyclohexane solution of butadiene was ceased. About 15 minutes later, the conversion of butadiene was almost 100%. The resulting polymer had a vinyl bond content of 15 wt %.

In a second reaction step, N,N,N',N'-tetraethylenediamine was added to the polymer solution prepared above in an amount of 0.5 mol per mole of n-butyllithium. A 30 wt % butadiene solution in cyclohexane was then fed to the reactor at a rate of 120 ml/min to conduct polymerization while keeping the inner temperature of the reactor at 90±3° C. When the amount of butadiene additionally fed to the reactor reached 395 g, the feed of the cyclohexane solution of butadiene was stopped. The conversion of butadiene reached almost 100% after 15 minutes. The resulting polymer had an average vinyl bond content of 28 wt %. The vinyl content of the butadiene portion formed in the second step was found to be 41 wt %.

Thereafter, hydrogenation reaction was performed in the same manner as in Example 4 to obtain a hydrogenated polymer (polymer 15). The hydrogenated polymer had a weight average molecular weight of 76,000 and a molecular weight distribution of 1.1. The degree of hydrogenation was 99%.

A high-molecular weight hydrogenated polymer (polymer 16) was obtained in the same manner, except for altering the amount of n-butyllithium added. The resulting hydrogenated polymer had a weight average molecular weight of 316,000 and a molecular weight distribution of 1.1. The degree of hydrogenation was 99%.

A cyclohexane solution of polymer 15 and a cyclohexane solution of polymer 16 were mixed in a ratio of 50%/50%, and the solvent was removed. The physical properties of the polymer were measured. The results are shown in Table 1. The relationship between hydrogenated vinyl bond content and crystallizing peak temperature is shown in FIG. 3.

Comparative Example 10

In a first reaction step, 3.7 l of cyclohexane, 13.4 ml of a 15 wt % n-butyllithium solution in cyclohexane, and 0.02 mol, per mole of n-butyllithium, of N,N,N',N'-tetraethylenediamine were put into a 10 liter-volume (L/D=4) jacketed tank reactor equipped with a stirrer. Then the inner temperature of the reactor was set at 90° C., and a 30 wt % butadiene solution in cyclohexane was fed to the reactor at a rate of 120 ml/min to perform polymerization. The inner temperature of the reactor was controlled within 90±3° C. by the jacket temperature. When the amount of butadiene fed to the reaction reached 395 g, the feed of the cyclohexane solution of butadiene was ceased. About 15 minutes later, the conversion of butadiene reached almost 100%. The resulting polymer had a vinyl bond content of 15 wt %.

In a second reaction step, N,N,N',N'-tetraethylenediamine was added to the polymer solution prepared above in an amount of 0.5 mol per mole of n-butyllithium. A 30 wt % butadiene solution in cyclohexane was then fed to the reactor at a rate of 120 ml/min to conduct polymerization while keeping the inner temperature of the reactor at 90±3° C. When the amount of butadiene additionally fed to the reactor reached 395 g, the feed of the cyclohexane solution of butadiene was stopped. The conversion of butadiene reached almost 100% after 15 minutes. After completion of the polymerization reaction, silicon tetrachloride was added in an amount of ¼ mol per mole of n-butyllithium to conduct coupling reaction.

The resulting polymer had an average vinyl bond content of 29 wt %. The vinyl content of the butadiene portion formed in the second step was 43 wt %.

Thereafter, hydrogenation reaction was performed in the same manner as in Example 4 to obtain a hydrogenated polymer (polymer 17). The characteristics of the hydrogenated polymer are shown in Table 1. The relationship between hydrogenated vinyl bond content and crystallizing peak temperature is shown in FIG. 3.

Example 6

Continuous polymerization was carried out in the same manner as in Example 1, except for changing the feed of n-butyllithium to 0.42 g per 100 g of butadiene. After completion of the polymerization reaction, silicon tetrachloride was continuously added to the polymer solution in an amount of ¼ mol per mole of n-butyllithium to conduct coupling reaction. Hydrogenation reaction was then performed by using hydrogenation catalyst I in the same manner as in Example 1. The characteristics of the resulting hydrogenated polymer (polymer 18) are shown in Table 1. The relationship between hydrogenated vinyl bond content and crystallizing peak temperature is shown in FIG. 3.

Example 7

Continuous polymerization and hydrogenation were carried out in the same manner as in Example 1, except for replacing the 20 wt % butadiene solution in cyclohexane with a cyclohexane solution containing butadiene and styrene in a weight ratio of 97.5/2.5 (total monomer concentration: 20 wt %), changing the amount of n-butyllithium added to 0.09 g per 100 g of butadiene, and changing the amount of N,N,N',N'-tetramethylethylenediamine added to 0.20 mol/Li. The characteristics of the resulting hydrogenated polymer (polymer 19) are shown in Table 1. The relationship between hydrogenated vinyl bond content and crystallizing peak temperature is shown in FIG. 3.

TABLE 1

Characteristics of Hydrogenated Polymer

| | | Polymer Structure | | | | | | |
|---|---|---|---|---|---|---|---|---|
| | | Before Hydrogenation | | | | | After Hydrogenation | |
| | | Max − Min | | | | | | |
| Example | Sample | Vinyl Content (wt %) | Vinyl Difference (wt %) | Coupling Agent | Mol. Wt. (×10$^4$) | Mol. Wt. Distribution (Mw/Mn) | Degree of Hydrogenation (%) | Hydrogenated Vinyl Content (%) |
| Ex. 1 | polymer 1 | 25 | ≦2 | none | 20.1 | 1.9 | 98 | 25 |
| Ex. 2 | polymer 2 | 30 | ≦2 | none | 23.3 | 1.9 | 100 | 30 |
| Comp. Ex. 1 | polymer 3 | 13 | ≦2 | none | 20.3 | 1.9 | failure of normal hydrogenation | |
| Comp. Ex. 2 | polymer 4 | 50 | ≦2 | none | 21.1 | 1.9 | 98 | 50 |
| Comp. Ex. 3 | polymer 5 | 25 | ≦2 | none | 21.4 | 1.9 | 70 | 25 |
| Comp. Ex. 4 | polymer 6 | 30 | ≦2 | none | 5.5 | 2 | 100 | 30 |
| Comp. Ex. 5 | polymer 7 | 30 | ≦2 | none | 65 | 1.9 | 100 | 30 |
| Ex. 3 | polymer 8 | 24 | 2 | none | 21 | 2 | 100 | 24 |
| Ex. 4 | polymer 9 | 27 | ≦5 | SiCl$_4$ | 20.3 | 1.6 | 99 | 27 |
| Comp. Ex. 6 | polymer 10 | 27 | ≦5 | none | 22.7 | 1.1 | 99 | 27 |
| Comp. Ex. 7 | polymer 11 | 27 | ≦5 | SiCl$_4$ | 22.1 | 7 | 99 | 27 |
| Comp. Ex. 8 | polymer 12 | 29 | ≧15 | none | 23 | 1.1 | 99 | 29 |
| Ex. 5 | polymer 13/polymer 14 = 50/50 | 28 | ≦5 | (blend) | 19.1 | 1.6 | 99 | 28 |
| Comp. Ex. 9 | polymer 15/polymer 16 = 50/50 | 28 | 26 | (blend) | 19.6 | 1.6 | 99 | 28 |
| Comp. Ex. 10 | polymer 17 | 29 | 28 | SiCl$_4$ | 21.5 | 1.3 | 99 | 29 |
| Ex. 6 | polymer 18 | 25 | ≦2 | SiCl$_4$ | 21.2 | 2.3 | 99 | 25 |
| Ex. 7 | polymer 19 | 21 | ≦2 | none | 25.1 | 2 | 100 | 21 |

| | | Polymer Characteristics | Polymer Physical Properties | | |
|---|---|---|---|---|---|
| | | Crystallizing | Tensile | Processability | |
| Example | Sample | Peak Temp. (° C.) | Strength (kg/cm$^2$) | MFR (g/10 min) | Melt Flow Ratio |
| Ex. 1 | polymer 1 | 48 | 360 | 2.7 | 7.3 |
| Ex. 2 | polymer 2 | 34 | 140 | 2 | 8.2 |
| Comp. Ex. 1 | polymer 3 | failure of normal hydrogenation | | | |
| Comp. Ex. 2 | polymer 4 | — | 10 | 3.6 | 7 |
| Comp. Ex. 3 | polymer 5 | 22 | 10 | 5.3 | 9.3 |
| Comp. Ex. 4 | polymer 6 | 35 | 40 | 80 | 8.6 |
| Comp. Ex. 5 | polymer 7 | 33 | 150 | 0.01 | 4.7 |
| Ex. 3 | polymer 8 | 50 | 350 | 2.2 | 7.5 |
| Ex. 4 | polymer 9 | 45 | 180 | 1.5 | 15 |
| Comp. Ex. 6 | polymer 10 | 43 | 200 | 1.9 | 3.8 |
| Comp. Ex. 7 | polymer 11 | 44 | 50 | 1.4 | 10 |
| Comp. Ex. 8 | polymer 12 | 49 | 100 | 1.2 | 3.6 |
| Ex. 5 | polymer 13/polymer 14 = 50/50 | 42 | 140 | 1.5 | 6.5 |
| Comp. Ex. 9 | polymer 15/polymer 16 = 50/50 | 70 | 50 | 1.1 | 5.1 |
| Comp. Ex. 10 | polymer 17 | 70 | 70 | 1.1 | 6.2 |
| Ex. 6 | polymer 18 | 47 | 210 | 1.7 | 16 |
| Ex. 7 | polymer 19 | 48 | 380 | 2.5 | 8.8 |

Example 8

A hydrogenated polymer (polymer 20) was obtained in the same manner as in Example 4, except for using 1,3-bis(N,N'-diglycidylaminomethyl)cyclohexane as a coupling agent. The resulting polymer was as excellent in performance as the polymer of Example 4.

Examples 9 to 13 and Comparative Examples 11 to 13

A polymer composition was prepared from 15 wt % of the hydrogenated polymer shown in Table 2, 75 wt % of the commercially available polypropylene resin (1), and 10 wt % of the talc. The physical properties of injection molded specimens prepared therefrom were measured. The results are shown in Table 2.

Examples 14 and 15

A polymer composition was prepared from 10 wt % of the hydrogenated polymer shown in Table 3, 70 wt % of the commercially available polypropylene resin (1), 10 wt % of the rubbery polymer, and 10 wt % of the talc. The physical properties of injection molded specimens obtained therefrom were measured. The results are shown in Table 3.

Comparative Example 14

A polymer composition was prepared from 70 wt % of the commercially available polypropylene resin (1) shown in Table 3, 20 wt % of the rubbery polymer, and 10 wt % of the talc. The physical properties of injection molded specimens obtained therefrom were measured. The results are shown in Table 3.

Examples 17 to 19

1,3-Dimethyl-2-imidazolidinone, maleic anhydride or ethylene oxide was added as a terminal modifier to a living polymer obtained in the same manner as in Example 1 in an amount of 1 mole per mole of n-butyllithium used to modify the living polymer. The modified polymer was hydrogenated in the same manner as in Example 1 to obtain a terminal modified hydrogenated polymer (polymer 22, 23 or 24).

Examples 20 and 21 and Comparative Examples 15 to 18

A film was prepared from a composition consisting of the hydrogenated polymer shown in Table 4 and the commer-

TABLE 2

Physical Properties of Polymer Composition
(Hydrogenated polymer/thermoplastic resin/talc = 15/75/10)

| | Composition Constitution | | | Physical Properties of Composition | | | |
|---|---|---|---|---|---|---|---|
| Example | Hydrogenated Polymer | Thermoplastic Resin | Additive | Flexural Modulus (MPa) | Izod Impact Strength (−30° C.) (J/m) | Heat Aging Resistance (%) | Processing Characteristics |
| Example 9 | polymer 1 | block PP | talc | 1900 | 48 | 82 | A |
| Example 10 | polymer 2 | block PP | talc | 1850 | 52 | 87 | A |
| Compara. Example 11 | polymer 4 | block PP | talc | 1650 | 50 | 80 | A |
| Example 11 | polymer 9 | block PP | talc | 1920 | 48 | 85 | A |
| Compara. Example 12 | polymer 10 | block PP | talc | 1820 | 48 | 82 | C |
| Compara. Example 13 | polymer 17 | block PP | talc | 1700 | 45 | 82 | B |
| Example 12 | polymer 18 | block PP | talc | 1880 | 54 | 85 | A |
| Example 13 | polymer 19 | block PP | talc | 1860 | 52 | 90 | A |

TABLE 3

Physical Properties of Polymer Composition

| | Composition Constitution | | | | Physical Properties of Composition | | |
|---|---|---|---|---|---|---|---|
| Example | Hydrogenated Polymer (wt %) | Thermoplastic Resin (wt %) | Rubbery Polymer (wt %) | Additive (wt %) | Flexural Modulus (MPa) | Izod Impact Strength (−30° C.) (J/m) | Heat Aging Resistance |
| Example 14 | polymer 18 10 | block PP 70 | H1062 10 | talc 10 | 1700 | 72 | 80 |
| Example 15 | polymer 18 10 | block PP 70 | EP02P 10 | talc 10 | 1680 | 70 | 77 |
| Compara. Example 14 | — — | block PP 70 | EP02P 20 | talc 10 | 1600 | 52 | 75 |

Example 16

Polymer 1 was modified with maleic anhydride as follows to prepare a modified polymer.

A hundred parts by weight of polymer 1 was mixed with 2.5 parts by weight of maleic anhydride and 0.2 part by weight of 2,5-dimethyl-2,5-di(t-butylperoxy)hexane (Perhexa 25B, available from NOF Corp. The mixture was transferred to a vented twin-screw extruder having a diameter of 30 mm and subjected to modification reaction at a temperature of 230° C. The resulting modified polymer (designated polymer 21) was found to have maleic anhydride added in an amount of 1.5 parts by weight per 100 parts by weight of the polymer.

Ninety parts by weight of the resulting modified polymer (polymer 21) and 10 parts by weight of the commercially available polyamide resin were kneaded in a twin-screw extruder to prepare a polymer composition. The Izod impact strength of the resulting composition was 225 J/m.

cially available polypropylene resin (2). The physical properties of the film were measured. The results are shown in Table 4.

TABLE 4

Film Physical Properties of Hydrogenated Polymer
(Hydrogenated polymer/thermoplastic resin = 20/80)

| | Constitution of Film Composition | | Film Physical Properties | |
|---|---|---|---|---|
| Example | Hydrogenated Polymer | Thermoplastic Resin | Film Impact (kg · cm/cm) | Haze (%) |
| Example 20 | polymer 1 | homo PP | 1350 | 8.8 |
| Example 21 | polymer 2 | homo PP | 1260 | 9.5 |
| Compara. Example 15 | — | homo PP* | 80 | 6 |

TABLE 4-continued

Film Physical Properties of Hydrogenated Polymer
(Hydrogenated polymer/thermoplastic resin = 20/80)

| Example | Constitution of Film Composition | | Film Physical Properties | |
|---|---|---|---|---|
| | Hydrogenated Polymer | Thermoplastic Resin | Film Impact (kg · cm/cm) | Haze (%) |
| Compara. Example 16 | polymer 4 | homo PP | 1080 | 16 |
| Compara. Example 17 | polymer 12 | homo PP | 1100 | 10 |
| Compara. Example 18 | polymer 17 | homo PP | 1010 | 24 |

*PP 100%

Example 22

A sheet was prepared from 30 parts by weight of polymer 2 (hydrogenated polymer) and the above-described commercially available rubbery polymers (2) comprised of 40 parts by weight of the hydrogenated block copolymer and 30 parts by weight of the ethylene-octene rubber, and the physical properties of the sheet were measured. As a result, the sheet had a hardness of 73, a tensile strength of 260 kg/cm², an elongation of 800%, and a haze of 2.0%.

Industrial Applicability

The hydrogenated polymer of the present invention is fit for industrial production and excellent in mechanical strength, heat resistance, weatherability, and processability. Compositions obtained by blending the hydrogenated polymer of the invention with other thermoplastic resins or rubbery polymers are excellent in impact resistance and moldability. Taking advantage of these characteristics, the hydrogenated polymer and its compositions are made into molded articles of various shapes by injection molding, extrusion or like methods, which find use as automobile parts (interior and exterior parts), various containers, domestic appliances, medical equipment parts, industrial parts, toys, and so forth.

Films or sheets comprising the hydrogenated polymer of the invention have high impact resistance and excellent transparency. These characteristics can be made use of in broad applications as food packaging films, personal article packaging films, clothing packaging films, and sheets for frozen food containers.

What is claimed is:

1. A hydrogenated polymer obtained by hydrogenating a conjugated diene polymer having an average vinyl bond content of 20% by weight or nore and less than 40% by weight to a degree such that 85% or more of double bond residues in the conjugated diene unit portion are hydrogenated, wherein (1) the crystallizing peak temperature and the hydrogenated vinyl bond content satisfy the formula:

$$-2.8V+100<T<-2.8V+130$$

wherein T is the crystallizing peak temperature (° C.) measured by DSC; and V is the hydrogenated vinyl bond content (%), (2) the weight average molecular weight is 60,000 to 600,000, and (3) the molecular weight distribution is 1.55 to 5.0.

2. The hydrogenated polymer according to claim 1, wherein the crystallizing peak temperature and the hydrogenated vinyl bond content satisfy the formula:

$$-2.8V+105<T<-2.8V+125.$$

3. The hydrogenated polymer according to claim 2, which is a hydrogenation product of a conjugated diene polymer having an average vinyl bond content of 20% by weight or more and less than 40% by weight and having a difference between the maximum and the minimum vinyl bond contents among the polymer chains that is less than 10% by weight.

4. A polymer composition comprising:

(a) 1 to 99 parts by weight of a hydrogenated polymer obtained by hydrogenating a conjugated diene polymer having an average vinyl bond content of 20% by weight or more and less than 40% by weight to a degree such that 85% or more of double bond residues in the conjugated diene unit portion are hydrogenated, wherein:

(1) the crystallizing peak temperature and the hydrogenated vinyl bond content satisfy the formula:

$$-2.8V+100<T<-2.8V+130$$

wherein T is the crystallizing peak temperature (° C.) measured by DSC; and V is the hydrogenated vinyl bond content (%), (2) the weight average molecular weight is 60,000 to 600,000, and (3) the molecular weight distribution is 1.55 to 5.0, and (b) 99 to 1 parts by weight of (b-1) a thermoplastic resin and/or (b-2) a rubbery polymer.

5. The polymer composition according to claim 4, containing at least 3 parts by weight of the thermoplastic resin (b-1).

6. The polymer composition according to claim 4, wherein component (b) is the rubbery polymer (b-2) and said rubber polymer is present in an amount of at least 3 parts by weight.

7. The hydrogenated polymer according to claim 1, which has a melt flow ratio of 4 to 30.

8. A film or a sheet containing a hydrogenated polymer according to claim 1.

9. The hydrogenated polymer according to claim 1, having bonded thereto an atomic group containing at least one polar group.

10. The hydrogenated polymer according to claim 1, having bonded thereto an atomic group containing at least one polar group selected from a hydroxyl group, a carboxyl group, a carbonyl group, a thiocarbonyl group, an acid anhydride group, an amido group, an amino group, an imino group, an epoxy group, a thioepoxy group, an isocyanate group, an isothiocyanate group, a silicon halide group and an alkoxysilicon group.

11. The hydrogenated polymer according to claim 10, wherein said atomic group containing at least one polar group is connected to an end of its polymeric chain.

12. The hydrogenated polymer according to claim 1, having bonded thereto an α,β-unsaturated carboxylic acid or a derivative thereof.

13. A polymer composition comprising (a) 1 to 99 parts by weight of a hydrogenated polymer according to any one of claims 9 to 12 and (b) 99 to 1 parts by weight of (b-1) a thermoplastic resin and/or (b-2) a rubbery polymer, the total amount of said components (a) and (b) taken as 100 parts by weight.

* * * * *